Aug. 1, 1961

W. P. JENNY 2,994,130

MAGNETOGRAM ANALYSIS

Filed Sept. 16, 1955

William P. Jenny
INVENTOR.

BY Murray Robinson

ATTORNEY

William P. Jenny
INVENTOR.

Aug. 1, 1961 W. P. JENNY 2,994,130
MAGNETOGRAM ANALYSIS
Filed Sept. 16, 1955 7 Sheets-Sheet 6

William P. Jenny
INVENTOR.

BY Murray Robinson

ATTORNEY

William P. Jenny
INVENTOR.

BY Murray Robinson

ATTORNEY

William P. Jenny
INVENTOR.

BY Murray Robinson

ATTORNEY

United States Patent Office 2,994,130
Patented Aug. 1, 1961

2,994,130
MAGNETOGRAM ANALYSIS
William P. Jenny, 4539 Waring St., Houston, Tex.
Filed Sept. 16, 1955, Ser. No. 534,840
8 Claims. (Cl. 33—27)

This invention pertains to method and apparatus for analysis of graphs and more particularly to method and apparatus for analysis of magnetograms, i.e. graphs of the earth's magnetic field intensity or of functions thereof. The invention further relates to the correlation of several graphs, e.g., magnetograms.

In searching for oil or other valuable subterranean mineral deposits it is usual to attempt to locate structures in the earth's formation which are favorable for the presence or accumulation of mineral deposits. Such structures usually produce anomalies in the various fields in the vicinity of the structure and surveys of the earth's fields are made to locate such anomalies. For example, surveys are made of the earth's magnetic field intensity.

In making magnetic surveys it is usual to measure the field intensity at spaced points along a straight line or traverse, and then to make further like measurements along a parallel straight line spaced horizontally from the first line.

The results of a survey along a single line give what is called a profile, this having reference to the concept of a three dimensional graph in which horizontal distances correspond to position over the earth's surface and vertical distances to the field intensity at each point over the earth's surface, analogous to a topographical relief map. It is to be noted here however that the field intensity traverse though made preferably at constant level, may be made at different height relative to the earth's surface as well as on the surface.

From a plurality of surveys, e.g. along a plurality of parallel lines, a map of field intensity over an area can be prepared. If points of equal field intensity are connected by continuous lines the result is an isogram map. Highs and lows and sharp breaks on such a map may indicate subterranean structures.

A difficulty that arises in basing interpretations on such isogram maps is the likelihood of false results due to lack of correlation between data from successive traverses which are taken at different times and subject to different errors of instrumental drift and diurnal variations.

It is also found that local structure may be masked by grosser changes in the earth's formation which are not indicative of possible mineral deposits. In order to eliminate the effect of the gross changes it has been usual to draw average curves through each orignal field intensity profile and to plot so called residual field intensity profiles showing the differences between the average curves and the original high resolution function profiles. From these residual profiles are prepared residual field intensity isogram maps. However in such a residual field intensity map the errors due to lack of correlation between the original data for each profile still remain and are compounded by the addition of other possible errors of correlation due to the variation of human judgment in drawing the average curves which form the bases from which deviations are measured.

Even well correlated residual field intensity isogram maps may be misleading, especially in the case of structures so close together that the field intensity anomalies caused by them overlap. For greater resolving power as needed to distinguish such adjacent structure there can be prepared by computation from the residual field intensity isogram map a map of the second derivative of the the field intensity.

Difficulties arise with second derivative maps, first because of the large amount of work needed to prepare them and second because errors of correlation are greatly magnified on second derivative maps.

The original object of the present invention was to make a residual field intensity map which would be free from errors of human judgment in drawing the average curve forming the base line. According to the invention successive chords are drawn between pairs of spaced points on a profile and the locus of the mid points of the chords is plotted and used as a base line. For profiles of slow variation a constant chord length can be used; for profiles of rapid change it is preferred to use chords of equal horizontal component.

It is found that the method of the invention has unexpected advantages, for not only does it provide a firm base line which gives results that can be correlated from profile to profile without the addition of errors due to variations in human judgment, but in addition it can be shown that the errors in correlation due to instrumental drift and diurnal variations, all of which are linear errors, are eliminated.

More important still, it is found that the function of the field intensity represented by the difference between the base line and original profile is a function having the same high resolving power as a second derivative, so that the result is not merely a residual field intensity map but is directly a map of a function equivalent to a second derivative map, thereby saving all the labor involved in computing such a map from the residual field isogram map.

According to a further development of the invention there is provided method of and apparatus for chording that quickly plots a function of the field intensity that has an even higher resolving power than the second derivative.

Another object of the invention is to provide apparatus for quickly, easily, accurately, and economically carrying out the methods of the invention.

Other objects and advantages of the invention will appear from the following description of preferred embodiments of the invention, reference being made to the accompanying drawings wherein.

Figure 1:
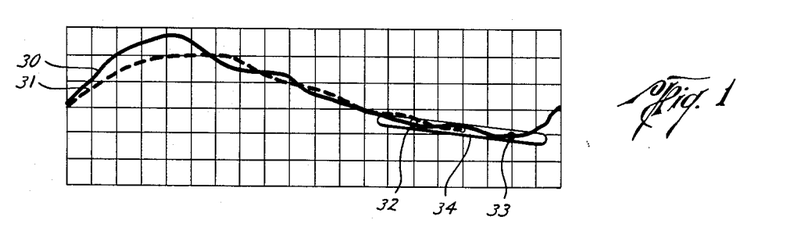
FIGURES 1–3 are plan views of profile maps illustrating various steps in carrying out the basic invention.

Referring now to FIGURE 1, there is a profile map on which field intensity, e.g. magnetic field intensity, is plotted as ordinates against distance along a traverse line as abscissae to form solid line curve 30. From curve 30 is prepared dotted line curve 31 by plotting the locus of the midpoint of chords of curve 30, the chords in this case being of length 32—33. The locus is conveniently plotted by means of a plotting device or chordometer shown at 34.

Figure 4:
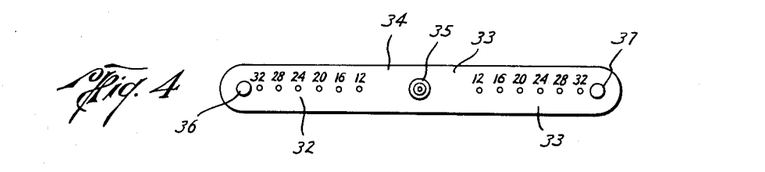
FIGURE 4 is a plan view of an apparatus used in the method of FIGURES 1–3.
Figure 5:
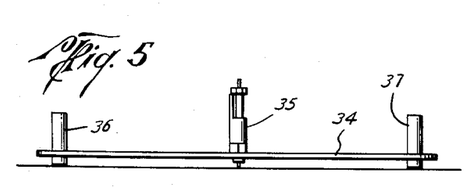
FIGURE 5 is a side view of the apparatus shown in FIGURE 4.
Figure 10:
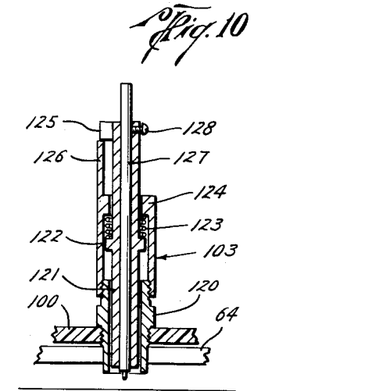

Referring now to FIGURES 4 and 5, there is shown chordometer 34 comprising a length of transparent sheet material such as methyl methacrylate having a scriber 35 at its midpoint, handles 36, 37 near its ends, and a plurality of pairs of indicia such as 32, 33 equally spaced from scriber 35. Scriber 35 may be of any type, for example that described hereinafter in more detail in connection with FIGURE 10.

In using the chordometer it is preferable to have two persons, each holding one of the handles 36, 37 and guiding the adjacent one of the indicia such as 32, 33, of the pair of indicia selected as the desired chord length, so as to keep the indicia on the curve 30 while moving it along the curve. With the pair of indicia 32, 33 thus kept on the curve while traversing the length of the curve, the scriber 35 automatically plots the locus of the midpoint of the chord.

The locus of the chord midpoint may be termed the chorded curve. The chorded curve will be much smoother than the original, due to the fact that the midpoint of the chord moves up and down only half as fast as one end of the chord, assuming the other end is to remain at the same height, and due further to the fact that if the ends are moving in opposite directions one up and the other down, their effects on the movement of the chord midpoint offset each other.

Figure 2:
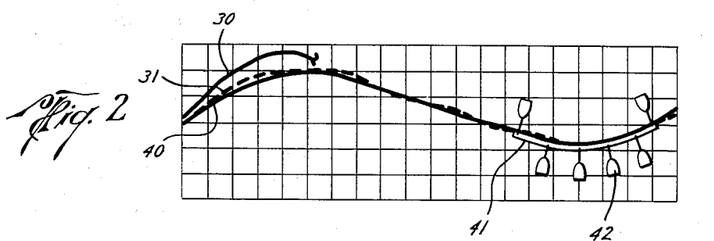

To produce an even smoother curve for a base line, the chorded curve may be averaged, as shown in FIGURE 2. For clarity, only a part of the original curve 30 is shown in FIGURE 2. As before, in FIGURE 1, the chorded curve 31 is shown dotted. The averaged curve is shown as heavy continuous line 40. It is produced by bending a spline 41 to follow the mean path of the chorded curve and then drawing a line along the spline. The spline may be made of flexible plastic material such as lead, or it may be made of flexible elastic material such as Celluloid. In the latter case it will be held in position with draftsman's weights 42, as shown.

The spline will have a certain minimum radius of curvature to which it can be bent and all wavelengths of the curve being splined that have a shorter radius of curvature will be flattened out to a greater or lesser degree.

Figure 3:
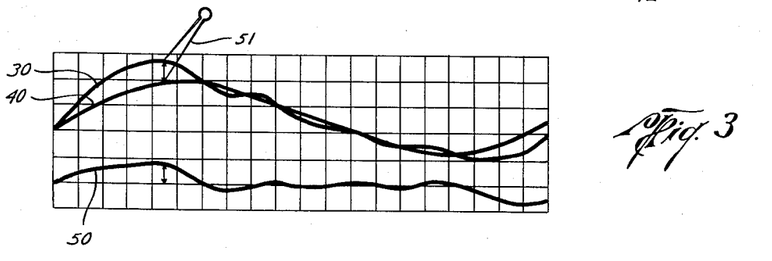

FIGURE 3 shows the method of producing a high resolution function profile 50 from the original curve 30 and the averaged chorded curve 40 by measuring the difference in ordinates, e.g. with calipers 51 and plotting the differences as ordinates.

It will be readily appreciated that even with two skilled operators there is some difficulty in producing a perfectly chorded curve with the apparatus of FIGURES 4 and 5, for if one operator finds his indicium to be off of the curve he will in bringing it back on the curve disturb the position of the other operator unless he moves in an arc of a circle having the other operator's indicium as a center.

It will also be understood that the effect of chording a curve having a generally steep slope will be different from the effect of chording a curve having a gentler more nearly level slope.

In order to facilitate the chording operation and produce a more uniform effect, the controlled chordometer of FIGURES 6–10 is provided, the FIGURES 4 and 5 chordometer being quite satisfactory for curves of gentle slope without too rapid variations.

Figure 6:
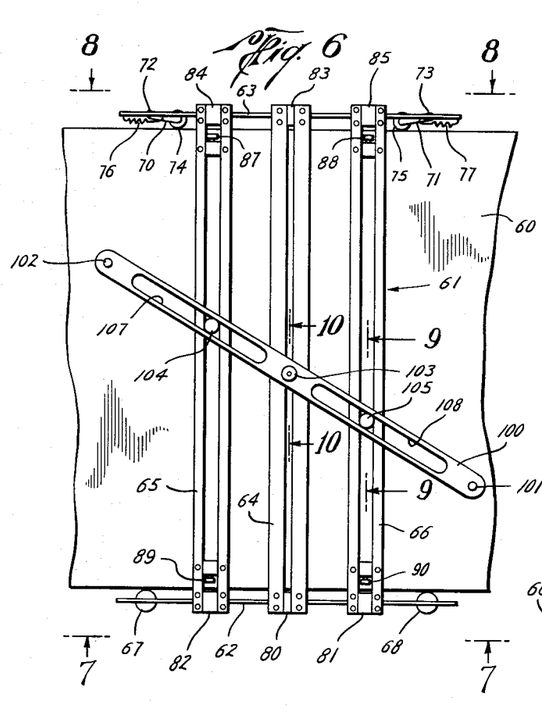
FIGURE 6 is a plan view of an apparatus used in carrying out a modified method according to the invention.

In FIGURE 6 there is shown a table 60 on top of which graph paper (not shown), may be secured, and over which the controlled chordometer 61 is placed. The chordometer 61 comprises a carriage including side members 62, 63 and cross members 64, 65, 66. Side member 62 carries two wheels 67, 68 mounted for rotation about vertical axes and adapted to engage one side of the table. Side member 63 carries two levers 70, 71, pivotally mounted on vertical axes 72, 73 carrying wheels 74, 75 rotatably mounted on vertical axes. Springs 76, 77 bias the levers and wheels against the side of the table.

Figure 7:
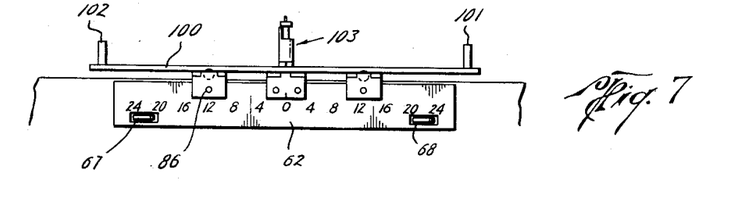
FIGURES 7–10 are sections taken on lines 7—7, 8—8, 9—9, and 10—10 of FIGURE 6.
Figure 8:
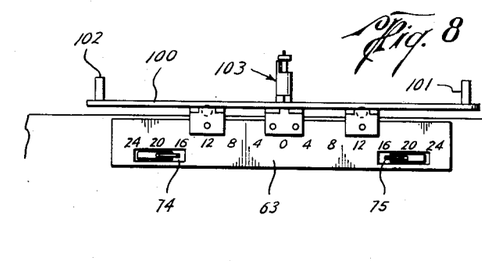
Figure 9:
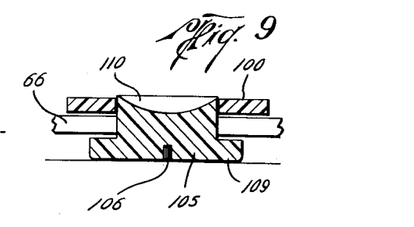

Each of the cross members 64—66 comprises two parallel bars spaced apart to form a slot therebetween and secured at their ends to blocks 80—85. These blocks have slots on their undersides to fit over side members 62, 63. Blocks 80 and 83 are secured to the centers of side members 62, 63 and blocks 81, 82 and 84, 85 are adjustable secured to side members 62, 63 by set screws such as 86 (FIGURE 7). At the ends of cross member 65, 66 are wheels 87, 88, 89, 90, mounted for rotation on horizontal axes and adapted to support the weight of the carriage and allow it to move freely lengthwise of the table.

Chordometer 61 further includes a guide bar 100, preferably made of plastic like the chordometer 34 of FIGURE 4, having handles 101, 102 and scriber 103. Cylindrical pins 104, 105 each carrying an indicium such as 106 (FIGURE 9) are disposed in slots 107, 108 of the guide bar and extend down through the slots in crossmembers 65, 66. There is a radial flange at the bottom of each pin as shown at 109 in FIGURE 9 which extends beneath the cross-member 66 so that the pin is retained by the cross-member in engagement with the paper on top of the table. The top of each pin is formed as a concave lens, as shown at 110, to increase the angle of visibility of indicium 106. Scriber 103 includes a tubular housing 120 screwed into the middle of guide 100 and extending down through the slot in cross-member 64. Slidably disposed in the housing 120 is a tube 121 having a flange 122 against which bears a helical spring 123 which is adjustably compressed thereagainst by cap 124 screwed to the top of housing 120. Tube 121 has a flange 125 at its upper end which engages a stop 126 on cap 124 to limit downward travel of the tube. A pencil or other marking device 127 is adjustably held in tube 121 by set screw 128.

In operating the chordometer 61, the operators move the indicia along the curve by means of handles 101, 102, the carriage being moved along the length of the table by the lateral pressure of the scriber and pins in the slots in the cross-members. At the same time the pins and scriber can move cross-wise of the table in the slots in the cross-members and so the indicia can be kept on the curve. The guide bar will pivot about either of pins 104, 105, and coordination of the movements of the operators will be facilitated because if an operator finds his indicium off the curve he need move his handle always only either up or down across the table to bring the indicium back on the curve, no motion lengthwise of the table being required.

It is to be noted that with the apparatus of FIGURE 6 the abscissae component of the chord length is fixed by the distance between cross-members 65, 66 and hence is constant for any one setting of the cross-members. With such controlled chording a curve having a half wave length equal to the chord length $c$ will produce a straight line locus. In other words, the chording tends to suppress entirely variations having a wavelength of twice the chord length or odd fractions thereof, e.g.

$$\frac{2c}{1}, \frac{2c}{3}, \frac{2c}{5}$$

and reduces the variations of curves of other frequency except those whose wave length is a simple fraction of the chord length or equal thereto, e.g.

$$\frac{c}{1}, \frac{c}{2}, \frac{c}{3}, \frac{c}{4},$$

or expressed in terms of twice the chord length, an even fraction thereof, e.g.

$$\frac{2c}{2}, \frac{2c}{4}, \frac{2c}{6}$$

It can also be shown mathematically that the ordinate at any abscissae of the chorded curve produced by the FIGURE 6 chordometer is approximately equal to the sum of the second derivatives of the original curve at two points on opposite sides of the point on the original curve having the same abscissae and spaced from the latter point by abscissae of less than half the chord length. For this reason the chorded curve may be called a compound second derivative curve. This is also true to a lesser approximation of a curve produced by the FIGURE 4 chordometer.

Figure 11:
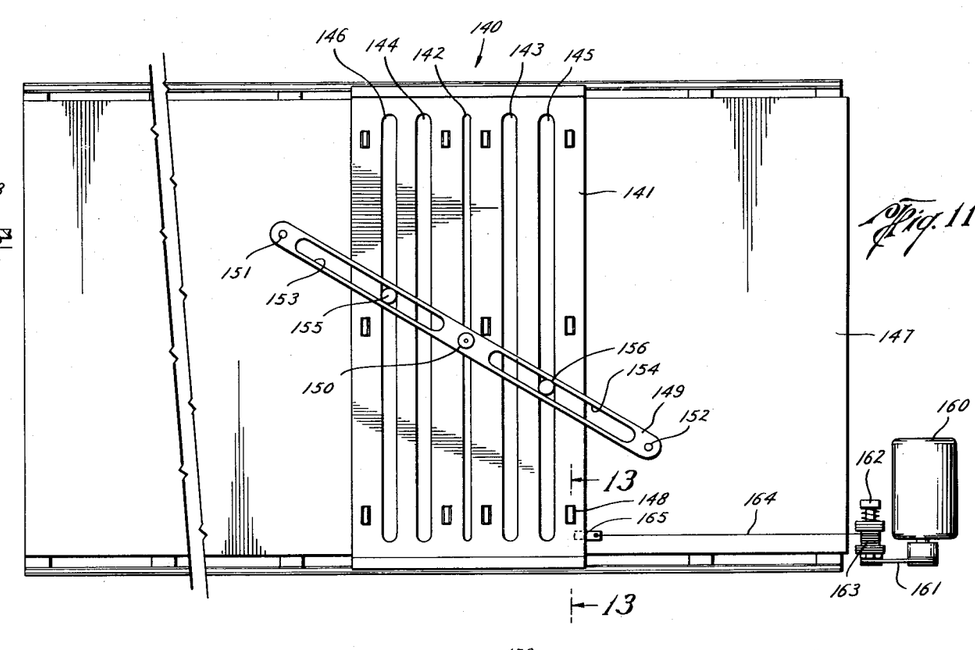
FIGURE 11 is a plan view of a modified form of the apparatus of FIGURES 6–10.
Figure 12:
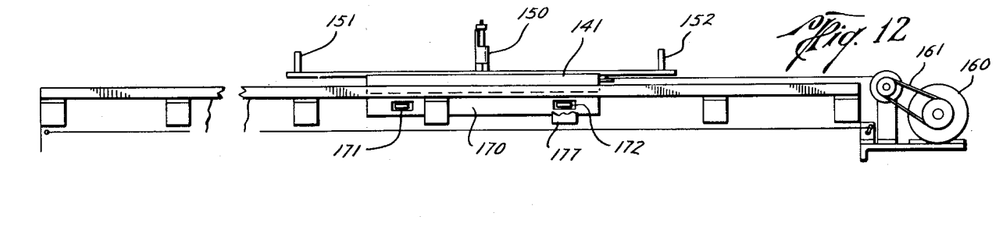
FIGURE 12 is a side view of the FIGURE 11 apparatus.
Figure 13:
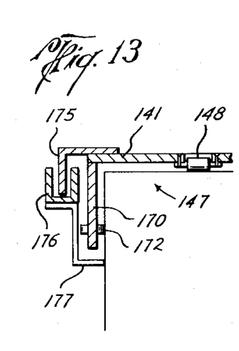
FIGURE 13 is a section taken on line 13—13 of FIGURE 11.

Referring now to FIGURES 11–13, there is shown a form of chordometer 140 similar to that of FIGURE 6 except that the carriage is motor driven along the length of the table in order to further simplify the task of the operators. Also, instead of having adjustably spaced cross-members there are provided a plurality of slots in a single cross-member, whereby desired spacing can be selected.

The chordometer 140 comprises a cross plate 141 having a central slot 142 and a plurality of pairs of side slots 143, 144 and 145, 146. The plate is supported on top of table 147 and the graph paper thereon (not shown) by a plurality of rollers 148. A guide bar 149 similar to guide bar 100 of the FIGURE 6 embodiment carries a scriber 150, handles 151, 152, and is slotted at 153, 154. Pins 155, 156, like pin 105 of FIGURE 9, bearing indicia defining points, slide in the side slots of the carriage, the scriber 150 sliding in the center slot 142.

A variable speed electric motor 160, driving through a friction belt transmission 161 and a clutch 162 turns a spool 163 on which winds a cable 164 connected to the cross plate 141 at 165. With the clutch disengaged the chordometer can be rolled to the end of the table remote from the motor. Then with the clutch engaged the motor will pull the chordometer to the other end of the table at the desired speed.

In order to keep the cross plate positioned at all times with its slots perpendicular to the direction of travel along the length of the table side plates such as 170 (FIGURES 12 and 13) are secured to the cross plate 141 and are provided with rollers such as 171, 172. At the opposite side of the table from plate 170 the side plate will be provided with rollers mounted on spring biased levers like rollers 74 and 75 of FIGURE 6. In addition, however, due to the torque produced by the asymmetric drive connection 165, it is desired to provide the cross plate with a side flange 175 (FIGURE 13) extending down into a guide slot 176 carried on brackets such as 177 along the side of the table. A similar guide channel and side flange may be used on the other side of the table.

Figure 14:
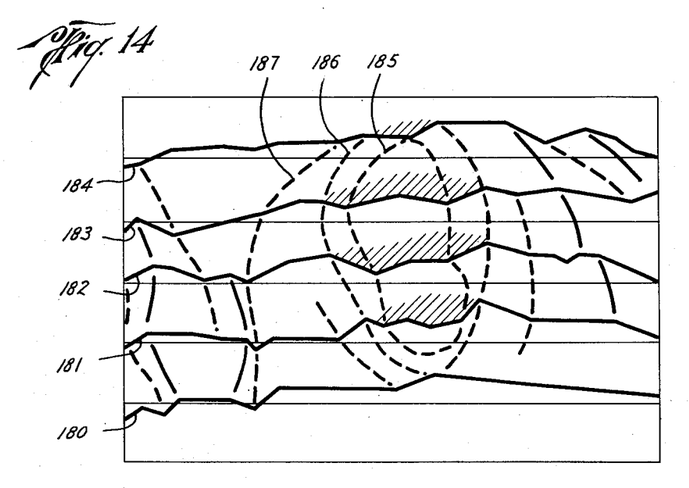
FIGURES 14–17 are profile maps.

Referring now to FIGURE 14 there is shown a map comprising a plurality of high resolution function profiles 180—184 whose axes of abscissae are spaced apart distances proportional to the horizontal spacing of the traverse lines on which the original profiles were made. These high resolution function profiles may be prepared according to the method set forth with reference to FIGURE 3 by chording the original profiles, preferably with a chordometer of the constant abscissae type such as described with reference to FIGURE 6 or 11, to produce curves of the compound second derivative type previously described, splining the latter curves, and plotting the difference between the original curves and the splined curves. Interpretative dashed lines 185—187 connect similar (all maxima or all minima) points of approximately equal magnitude on the different curves at places where there is an anomaly in the general trend. This anomaly is a depression below the general trend indicated by the shaded area. This depression may be the effect of a salt dome beneath the earth's surface, whose location is outlined by the dashed lines. This is a quick and simple method of interpretation in lieu of preparation of an isogram map of the usual variety.

Interpreting a map such as shown in FIGURE 14 is much less difficult than interpreting maps made by previously known methods since the similar points connected by the interpretation lines will be related in that each point where an interpretation line intersects a profile will be approximately equal in magnitude to the points where the same interpretation line intersects the immediately adjacent profiles, even though over a large map widely separated points in one interpretation line may show a large difference in magnitude and may even be of opposite signs.

Figure 15:
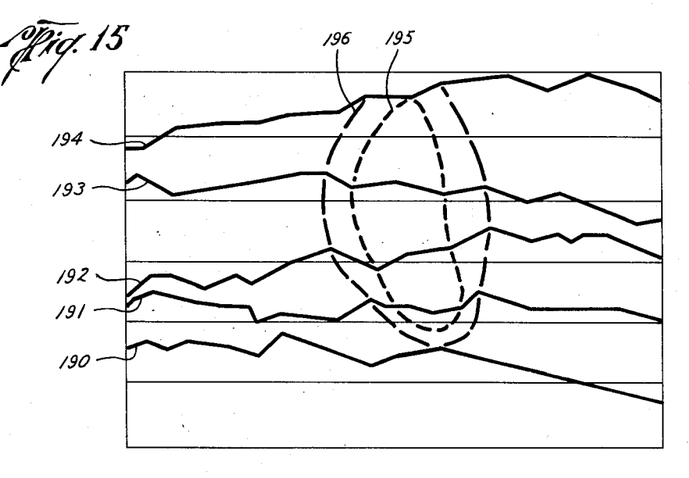

FIGURE 15 shows a map comprising a plurality of ordinary residual field intensity profiles 190—194. These curves are a type prepared by splining directly the original profiles and plotting the difference between the originals and the splined or average curves. Due to the floating base line provided in this method, there is a lack of correlation between the resultant residual field profiles which is readily apparent from the figure. Curve 192, for example, is displaced way below its axis of abscissae. This lack of correlation makes interpretation difficult, for reliance must be placed solely on correlation of changes in curvature in drawing interpretative lines such as 195, 196, which no longer are approximate lines of equal magnitude. It will also be noticed that the interpreted position of the salt dome in FIGURE 15 is somewhat displaced horizontally from that of FIGURE 14, which is very important since a well drilled a few feet off from the formation is just as dry as one drilled a mile off.

Figure 16:
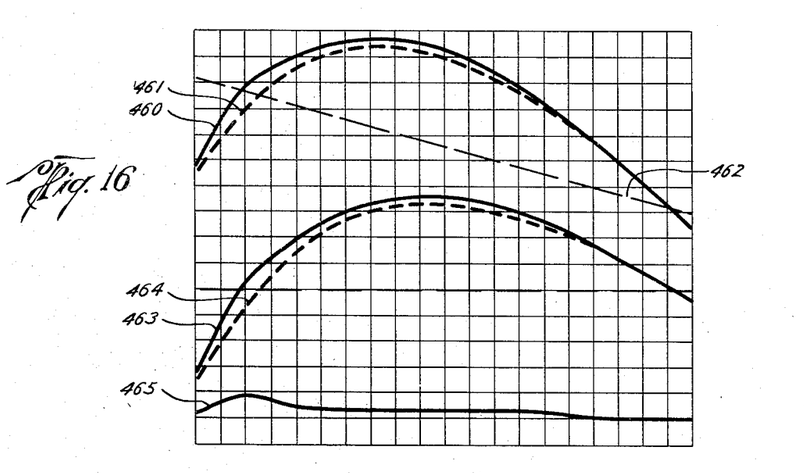

Referring now to FIGURE 16, there is shown at the top an original profile 460 and chorded profile 461, with correction curve 462 superimposed thereon showing the total correction for factors such as instrumental drift, daily field variation and the like, all of which are assumed to be linear or near linear functions. At the middle of the figure is plotted a corrected profile 463 equal to 460 less 462, and chorded corrected profile 464. At the bottom is plotted curve 465 representing the difference between curves 460 and 461, which it is found, is the same as a curve plotting the difference of curves 463 and 464.

The foregoing illustrates the fact that the chording method offers a unique opportunity to correlate individual parallel profiles with one another independently from actual cross measurements correlating the individual profiles. This is especially important in aerial micromagnetic surveys of the type described in my prior United States Patent 2,635,134, issued April 14, 1953, entitled, "Surface Micromagnetic Survey Method." In such surveys the measured accuracy along a profile is always superior to the calculated accuracy between profiles and where the terrestrial dip, instrumental drift and daily variation corrections as a rule are linear or near linear functions of the distance.

Figure 17:
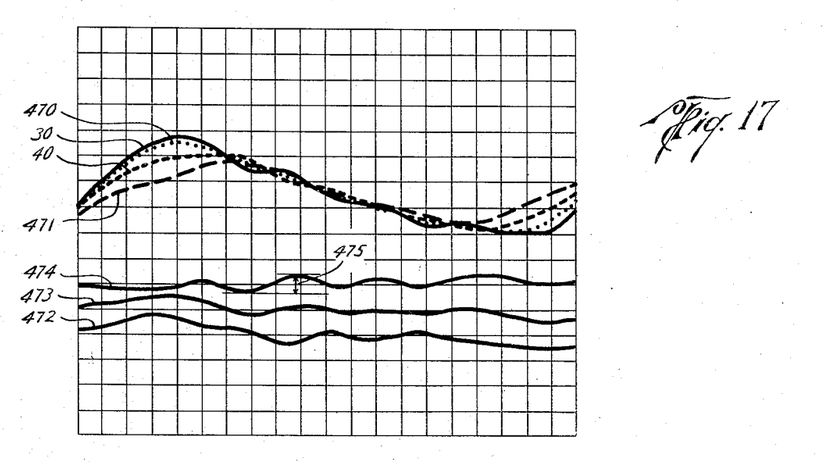

Referring now to FIGURE 17, there is illustrated the method of preparation of a profile of even higher resolving power than the compound second derivative curve 50 of FIGURE 3. The curve 30 is the same original profile. From this are prepared by chording (without any splining) the three chorded curves 40 (the same as in FIGURE 3), 470, and 471, the curves 470 and 471 being prepared using respectively a chord length half that used for curve 40 and one and one half times that used for curve 40, so that the cord lengths for the three curves 470, 40, and 471 are in the ratio 1:2:3. From curves or profiles 470, 40, and 471 are prepared difference curves 472, 473, and 474 in which curve 472 equals curve 40 less curve 471 and curve 473 equals curve 470 less curve 40, and curve 474 equals curve 473 less curve 472. The resultant curve 474 is substantially free from regional effects whereas local effects such as that at 475 are approximately twice the corresponding effect on curve 50 of FIGURE 3. Over local disturbances widening and contraction between curves 472 and 473 occur whereas over regional structures they are fairly parallel.

Figures 18, 19:
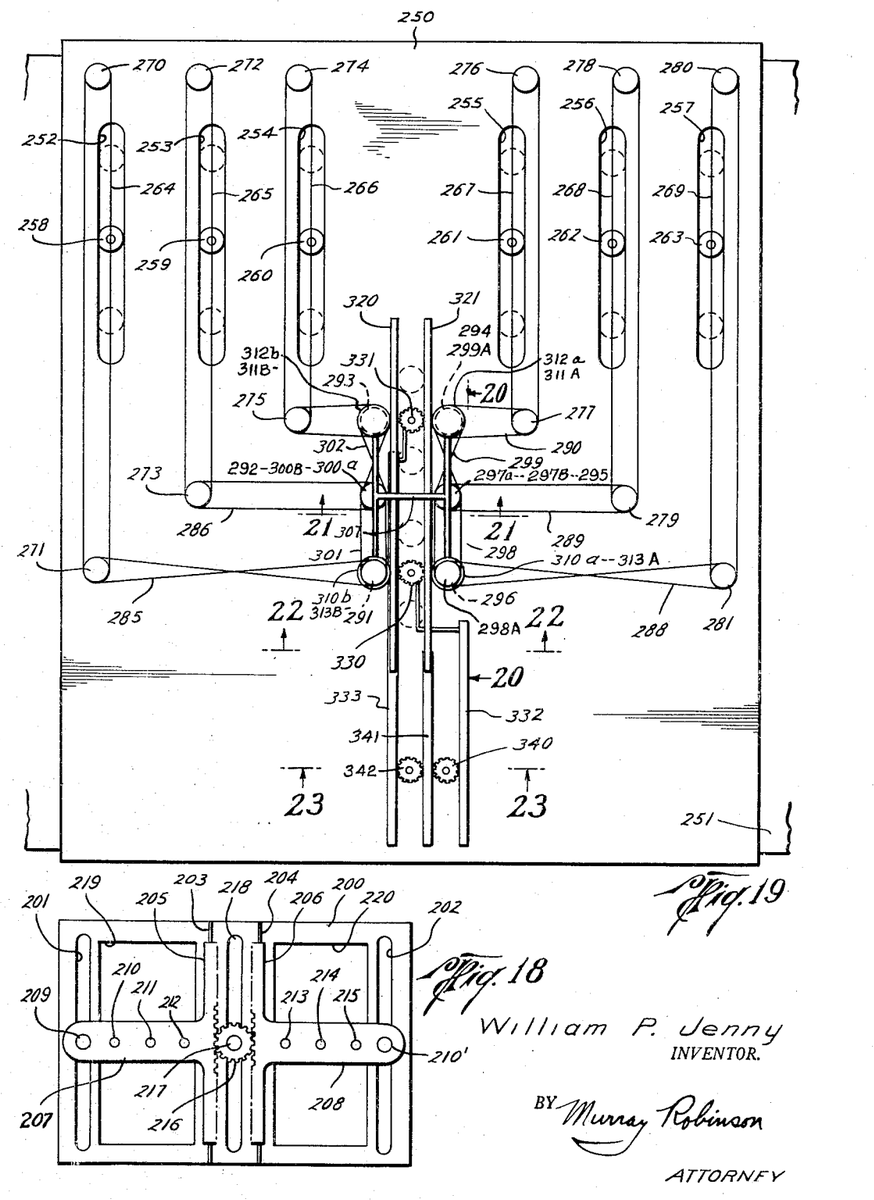
FIGURE 18 is a plan view of an apparatus for carrying out a further modification of the method of the invention.
FIGURE 19 is a plan view of a modified form of the apparatus of FIGURE 18.

FIGURE 18 shows an apparatus which may be used for performing the triple chording and method described in connection with FIGURE 17. This apparatus comprises a carriage including a transparent cross plate 200 which is provided with support and guide rollers (not shown) like the cross plate of the apparatus of FIGURE 11. There are two guide slots 201, 202 in the cross plate and two guide fins 203, 204 on top of the strip. A pair of racks 205, 206 are slotted on their undersides to slidably engage the guide fins. The racks carry transverse arms 207, 208, which are provided with pins 209, 210' which extend downwardly into slots 201, 202 and which extend upwardly to provide handles. The arms 207, 208 carry indicia 210—215 designating points. A pinion 216 engaging racks 205, 206, carries a scriber 217 which moves in slot 218 to engage the paper below the cross plate. The cross plate is cut out at 219, 220 so that the indices on arms 207, 208 can extend downwardly into contact with the paper.

With the FIGURE 18 apparatus, the carriage or cross plate can be moved over the original profile with a pair of indicia equally spaced from the scriber kept on the curve by the operators moving the arms, and hence the racks, up and down. An important advantage of this form of the apparatus is that motion of one of the arms by one of the operators does not in any way affect the other arm or interfere with its setting by the other operator. The racks drive the pinion to cause the scriber to mark the locus of the chord midpoint. This process is then repeated twice using the other two pairs of indicia and thus plotting the three chorded curves from which the difference curves can be constructed with calipers or other measuring device. Obviously, the FIGURE 18 apparatus can also be used for single chording and the previously described apparatuses can also be used for triple chording. It is also obvious that the FIGURE 18 apparatus can be substituted for the slotted plate 141 and member 149 of the motor driven apparatus of FIGURE 11.

FIGURE 19 shows an apparatus which automatically constructs the final difference curve directly from the original profile. The apparatus comprises a carriage or cross plate 250 riding on a table 251 as in the FIGURE 11 embodiment. A plurality of slots 252—257 guide indicium bearing pins 258—263. The pins are connected to drive cables 264—269 which pass around pairs of pulleys 270—281. Pulleys 271, 273, 275, 277, 279, 281 are double groove pulleys and drive cables 285—290 which in turn drive pulleys 291—296.

Figure 20:
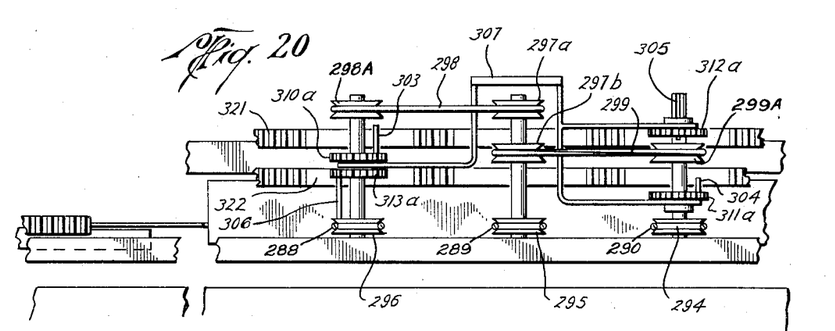
FIGURES 20–23 are sections taken on the lines 20—20, 21—21, 22—22, and 23—23 of FIGURE 19.

As shown in FIGURE 20, pulley 295 drives coaxial pulleys 297A and 297B, which drive cables 298, 299. Similarly (see FIGURE 19), pulley 292 drives pulleys 300A and 300B which drive cables 301, 302. Referring more particularly to FIGURE 20 again, cables 298, 299 drive pulleys 298A, 299A, which, when engaged respectively with clutch pins 303, 304, drive gears 310A, 311A. Cables 301, 302 (FIGURE 19) similarly drive a pair of gears 310B, 311B. Pulley 294 drives gear 312A when engaged through clutch spline 305, and pulley 296, when engaged with clutch pin 306 (see FIGURE 20), drives gear 313A. Pulleys 291, 293 (FIGURE 19) similarly drive a similar pair of gears 312B, 313B. Clutch operator 307 engages the clutches, thereby driving gears 310A and 311A when the clutch operator is raised and driving gears 312A and 313A when it is lowered. The several sets of gears engage four racks, including racks 320, 321 and two racks therebelow, one which is shown at 322 in FIGURE 20, the fourth rack 323 also showing up in FIGURE 21.

Figure 21:
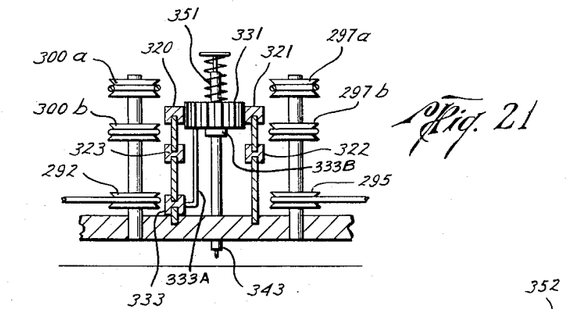
Figure 22:
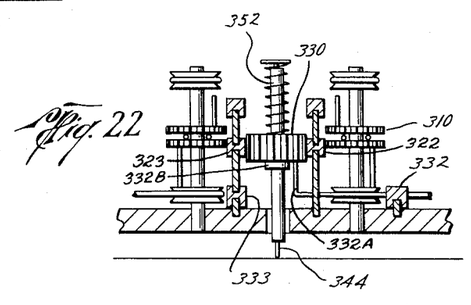
Figure 23:
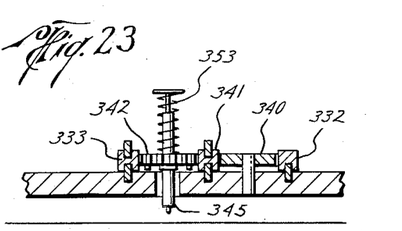

As shown in FIGURES 21 and 22, racks 320, 321 drive pinion 331 and racks 322, 323 drive pinion 330. Pinions 330 and 331 are connected respectively to rack 332, 333 by means of bars 332A and 333A, the upper ends of the bars being secured to the bearings 332B and 333B on which the respective pinions 330 and 331 are mounted. Rack 332 drives fixed axis pinion 340 (FIGURES 19 and 23) which in turn drives rack 341. Racks 341 and 333 drive pinion 342. Pinions 331, 330 and 342 carry scribers 343, 344, 345 which plot the three curves 472, 473, 474 of FIGURE 17.

In operation the clutch operator is in its lowest position and the inner and outer pairs of indicia pins 260, 261; 258, 263 are placed on the curve. Then the clutch operator is raised and the middle pair of indicia 259, 262 are placed on the curve. Then the scribers 343, 344, 345 are depressed against the bias of springs 351, 352, 353 to mark points on the three curves. Then the chordometer is moved to a new position and the process repeated.

It will be seen that when indicia pins 260, 261 are placed on the curve they drive pulleys 293, 294, which, through intermediate gearing, drive racks 320, 321 through the teeth on the outsides thereof. Motion of racks 320, 321 drives pinion 331 (FIGURES 19 and 21) through the teeth on the innermost sides of the racks. At the same time when indicia pins 258, 263 are placed on the curve they drive pulleys 291, 296, which, through intermediate gearing, drive racks 323, 322 through the teeth on the outsides thereof. Motion of racks 323, 322 drives pinion 330 (FIGURES 19 and 22) through the teeth on the innermost sides of the racks. The motions of pinions 331 and 330 thus far is that produced by simple chording of the curve using different lengths of chords. These may be said to be producing curves $x$ and $z$.

Then when the clutch operator is raised and the indicia pins 259, 262 placed on the curve, they drive pulleys 292, 295, which, through intermediate gearing, drive both racks 320, 321 and racks 323, 322, thereby driving both pinions 331 and 330 an additional amount. The additional amount pinions 331 and 330 are driven is proportional to the magnitude of another simple chorded curve of different chord length which may be called the curve $y$. Due to the reversed direction of coupling of indicia pins 259, 262 to the pinion compared to that of the other four indicia pins, the resultant motions of the pinions 331, 330 are proportional to $(x-y)$ and $(y-z)$ respectively.

Pinion 331 drives rack 333 proportional to $(x-y)$ while pinion 330, through the intermediary of rack 332 and fixed pinion 340, drives rack 341 proportional to $-(y-z)$ so that pinion 342 is driven by racks 333 and 341 proportional to $(x-y)-(y-z)$ which is the desired resultant function to be plotted. The scribers 343, 344, 345 moving with pinions 331, 330, and 342 thus plot the curves $(x-y)$, $(y-z)$, and $(x-y)-(y-z)$ as shown in FIGURE 17.

While preferred embodiments of the invention have been shown and described, many modifications thereof can be made by one skilled in the art without departing from the spirit of the invention and it is desired to protect by Letters Patent all forms of the invention falling within the scope of the following claims:

1. A chordometer comprising a carriage, three pairs of indicia means, means coupling each pair of indicia means to the carriage for transverse motion relative thereto while maintaining constant the distance longitudinally between each pair of indicia means, a scriber, and means for coupling the scriber to each of said pairs of indicia means to produce a motion of the scriber proportional to $(x-y)-(y-z)$ where $x$, $y$, and $z$ are functions representing the locus of the midpoints of the chords between each pair of indicia means.

2. A chordometer comprising carriage means adapted to traverse a table top, a pair of means each including indicium means, scriber actuation means on the midline between said indicium means, means coupling said pair of means and said scriber actuation means to said carriage means for motion transverse to the table while maintaining constant the component of the distances between the indicium means and said scriber actuation means in the direction of travel of the carriage means relative to the table top, said scriber actuation means including a pinion, and means connecting said pair of means and said scriber actuation means to cause transverse motion of said scriber actuation means in proportion to the algebraic average of the motions of said indicia means transverse to said table, said connecting means including racks each connected to one of said pair of means and in driving relationship with said pinion.

3. The combination of claim 2 in which said indicium means comprise transparent bodies having concave upper surfaces forming diverging lenses.

4. The combination of claim 2 in which said carriage means includes power means to drive said carriage means along a table at a desired speed and a clutch to render said power means ineffective when desired.

5. The combination of claim 4 in which said carriage means includes means to engage the sides of a table to guide the carriage means along the length of the table and prevent angular motion of the carriage means relative to the table top.

6. The combination of claim 2 in which said carriage means includes means to engage the sides of a table to guide the carriage means along the length of the table and prevent angular motion of the carriage means relative to the table top.

7. The combination of claim 2 wherein said pair of means each includes a plurality of spaced apart indicia, the distances of said indicia of one of said indicia means from the scriber actuation means being respectively the same as the distances therefrom of the indicia of the other indicia means.

8. The combination of claim 7 wherein said coupling means permits individual adjustment transversely of the table of the position of each of said plurality of spaced apart indicia, there being three pairs of said indicia, said scriber actuation means includes two pinions in addition to the pinion previously specified, three separate scribers conrtolled by said three pinions, and the means connecting the aforesaid pair of means to the scriber actuation means includes means for successively driving two of said pinions distances proportional to the algebraic average of the motion of two of said pairs of indicia respectively and then both proportional to the algebraic average of the motions of the other pair of said indicia, and said scriber actuation means further includes means connecting the last mentioned two pinions to the other of the three said pinions to drive it proportional to the difference between the motions of said two pinions.

References Cited in the file of this patent

UNITED STATES PATENTS

| | | |
|---|---|---|
| 773,035 | Smith | Oct. 25, 1904 |
| 1,262,434 | Beeck | Apr. 9, 1918 |
| 1,488,190 | Bloch | Mar. 25, 1924 |
| 2,309,930 | Byerly | Feb. 2, 1943 |
| 2,764,818 | Gard | Oct. 2, 1956 |

FOREIGN PATENTS

| | | |
|---|---|---|
| 144,519 | Austria | Feb. 10, 1936 |
| 742,012 | Germany | Dec. 6, 1943 |